UNITED STATES PATENT OFFICE.

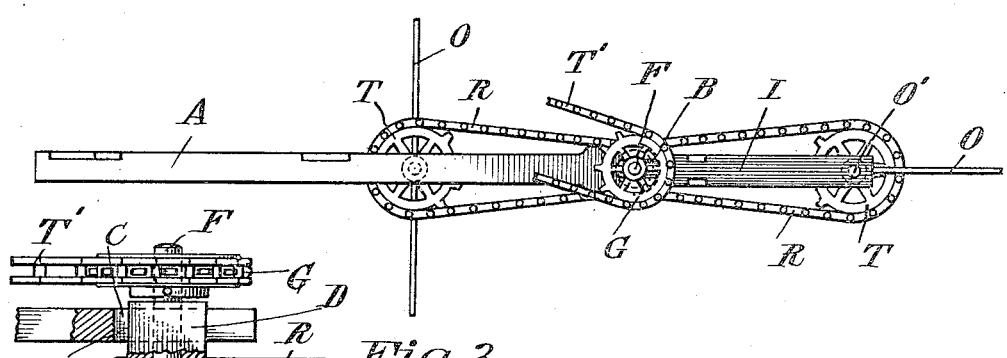
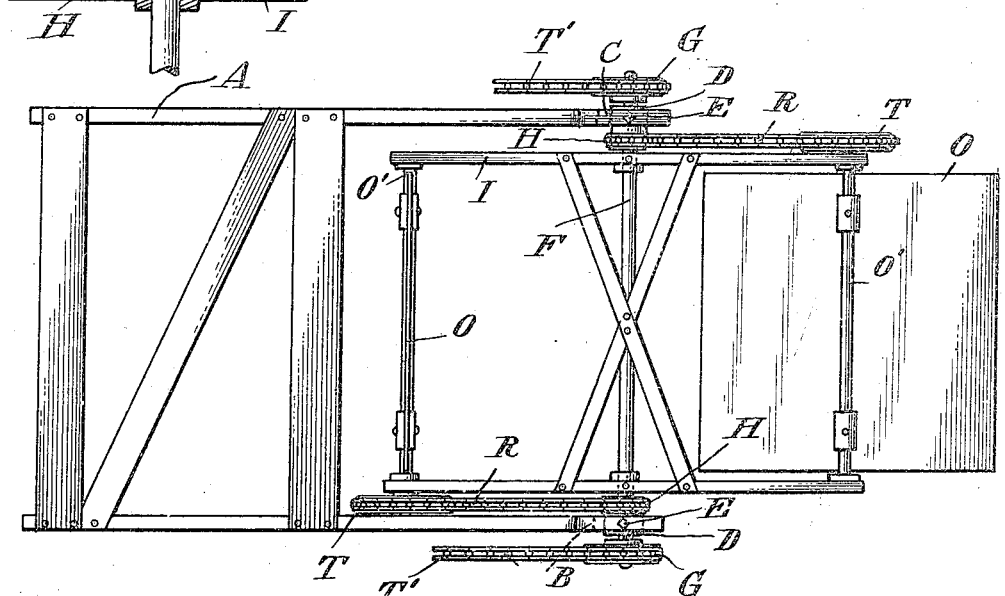

LEONARD STUDY, OF THURMAN, IOWA.

FAN-PROPELLER.

1,252,195.  Specification of Letters Patent.  Patented Jan. 1, 1918.

Application filed November 17, 1915. Serial No. 62,045.

*To all whom it may concern:*

Be it known that I, LEONARD STUDY, a citizen of the United States, residing at Thurman, in the county of Fremont and State of Iowa, have invented certain new and useful Improvements in Fan - Propellers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fan propellers and consists in the provision of a simple and efficient apparatus of this nature having various details of construction, combinations and arrangements of parts which will be hereinafter fully described, shown in the accompanying drawings and then specifically defined in the appended claim.

I illustrate my invention in the accompanying drawings in which:

Figure 1 is a side elevation of the invention.

Fig. 2 is a plan view.

Fig. 3 is a detail horizontal sectional view, parts being shown in plan.

Reference now being had to the details of the drawings by letter, A designates the frame of the apparatus, reinforced by cross-pieces having slots C at the ends of the side beams and in which bearings D are mounted and held therein by set screws E. A shaft F is journaled in said bearings and has sprocket wheels G keyed to the ends thereof, and T' designates a sprocket chain passing about the sprocket wheel and forming means whereby power is applied. It will be noted that there are two of said sprocket wheels G, one mounted at each end of the shaft and two chains T'. Said bearings D have integral sprocket wheels H fixed thereto and about which chains R pass, which also pass about sprocket wheels T fixed to fan shafts O' which are journaled in the side pieces I of the frame carrying said fans.

The parts being adjusted as shown and described, power is applied through the sprocket chains T', causing the shaft F to rotate and with it the frame I carrying the fans. As the sprocket wheels H upon the bearings D are stationary, the sprocket wheels T will be caused to rotate the fans.

While I have shown and described wheels and chains for operating my fan or propeller, it will be understood that I do not confine myself to this manner of driving the fans as obviously gear mechanism of different kinds might be substituted to give the same movements.

What I claim to be new is:—

A fan propelling apparatus, comprising a stationary frame with two parallel bars recessed at their ends, bearing sleeves adjustably held in said recesses and each having a series of sprocket teeth about its circumference, a driving shaft mounted in said bearings, sprocket wheels fixed to said shaft, a rectangular outlined frame journaled centrally upon said shaft, fan shafts journaled in the rectangular frame and each having an end projecting through the latter in opposite directions, sprocket wheels keyed to the projecting ends of the fan shafts and having sprocket chain connections with the teeth upon said bearing sleeves.

In testimony whereof I hereunto affix my signature in presence of two witnesses.

LEONARD STUDY.

Witnesses:
 I. A. LOOSE,
 W. M. PAUL.

Copies of this patent may be obtained for five cents each, by addressing the "Commissioner of Patents, Washington, D. C."